July 9, 1963 H. FICKLER 3,097,005
JOINT HEAD FOR MOVABLY CONNECTING TWO MACHINE ELEMENTS
Filed Feb. 10, 1960 3 Sheets-Sheet 1

INVENTOR:
HANS FICKLER
By:
Watson, Cole, Grindle & Watson
ATTORNEYS

July 9, 1963  H. FICKLER  3,097,005
JOINT HEAD FOR MOVABLY CONNECTING TWO MACHINE ELEMENTS
Filed Feb. 10, 1960  3 Sheets-Sheet 2

INVENTOR:
HANS FICKLER
By:
Watson, Cole, Grindle & Watson
ATTORNEYS

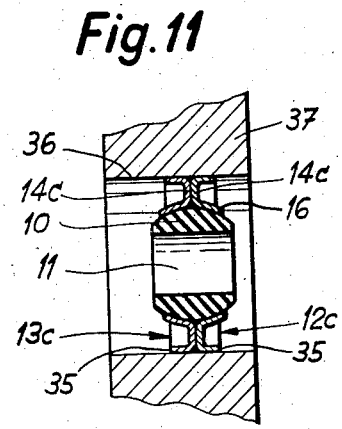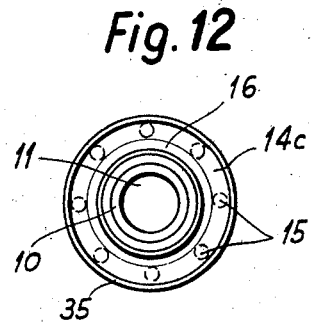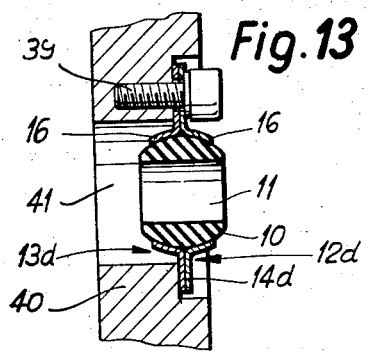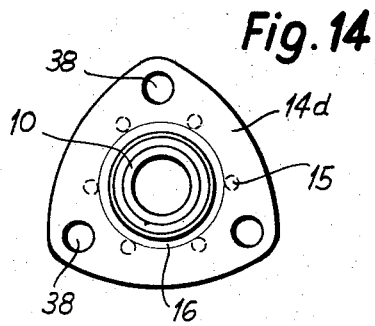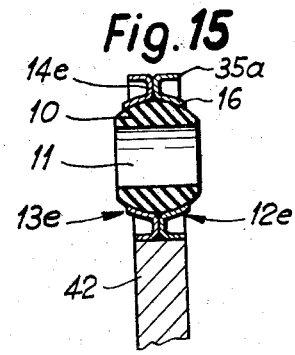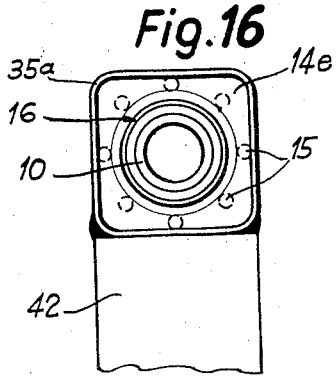

United States Patent Office 3,097,005
Patented July 9, 1963

3,097,005
JOINT HEAD FOR MOVABLY CONNECTING TWO MACHINE ELEMENTS
Hans Fickler, Seuzach, Switzerland, assignor to Industriewerk Schaeffler, Herzogenaurach, Germany
Filed Feb. 10, 1960, Ser. No. 8,478
Claims priority, application Switzerland Mar. 6, 1959
3 Claims. (Cl. 287—90)

This invention relates to a joint head for movably connecting two machine elements, particularly levers and linkages. The joint head possesses an outside spherical body and a cage supporting the same; it differs from the known embodiments of the type principally in that the cage is made up of two parts which include interengaging flanges connected to each other and outwardly pressed hollow-spherical portions.

This design enables a very efficient and accordingly low-priced production of the joint head, inasmuch as the two parts of the cage may be stamped and pressed from sheet-metal, in contradistinction to prior art embodiments, for the production of which turning work has been necessary.

Further features of the invention will appear from the following description and claims, taken in conjunction with the accompanying drawing, wherein there are shown purely by way of example some forms of embodiment incorporating the invention.

In said annexed drawing:

FIG. 11 shows a sectional view of a joint head as mounted within a bore of a machine part, as a sixth form;

FIG. 12 is a front view of the same joint head alone;

FIG. 13 shows a joint head as mounted on a machine part by means of a screw, as another form of embodiment;

FIG. 14 is a front view of this joint head alone;

FIG. 15 represents a sectional view of a joint head as fixed to a machine part by welding or soldering, as a last form;

FIG. 16 shows a front view of the same.

Figure 1:
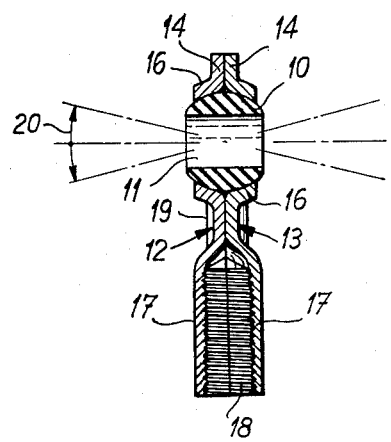
FIG. 1 shows a sectional view of a first form of embodiment of the joint head.
Figure 2:
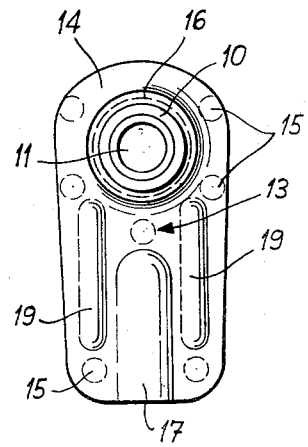
FIG. 2 is a view of the joint head as seen from the left in FIG. 1.

Referring more particularly to FIGS. 1 and 2, the joint head includes an outside spherical body 10 with a diametrical bore 11. Said body preferably consists of some elastically compressible synthetic resin resistant to abrasion or of some sintered material, whereby lubrication of the joint head may be done away with.

The body 10 is swivably supported within a cage 12, 13 which is made up of two stamped and pressed sheet-metal parts 12, 13, preferably of sheet-steel. Said two sheet-metal parts 12, 13 are of entirely identical design and include interengaging flanges 14 connected to each other by welding spots 15. Each of said parts 12, 13 has a hollow-spherical segmental portion 16 pressed outwards, in the middle of which there is an aperture giving access to the spherical body 10. The hollow-spherical portions 16 together constitute the bearing for the body 10.

The two sheet-metal parts 12, 13 include furthermore two semi-cylindrical outwardly pressed portions 17 which together enclose a cylindric opening having a screw-thread 18 cut therein. Moreover, for reinforcement, said parts 12, 13 have ribs 19 pressed outwards thereof.

The disclosed joint head serves for swivelably connecting two machine elements, say a lever and a linkage. Fastening to the elements to be interconnected may be done in the most varied manner and depends from case to case on the existing conditions and on the problem to be solved. For instance, the linkage may at one end be provided with a threaded portion which screws into the thread 18. The spherical body 10, for instance, is mounted on said lever or another linkage by means of a screw which passes through the bore 11. But the body 10 could also be mounted on a crankpin. It may be swivelled relative to the cage 12, 13, not only about the axis of the bore 11, but rocking of said axis about the center of curvature of the spherical outer surface of body 10 within a certain angle 20 would also be possible, as shown in chain-dotted lines in FIG. 1.

Figure 3:
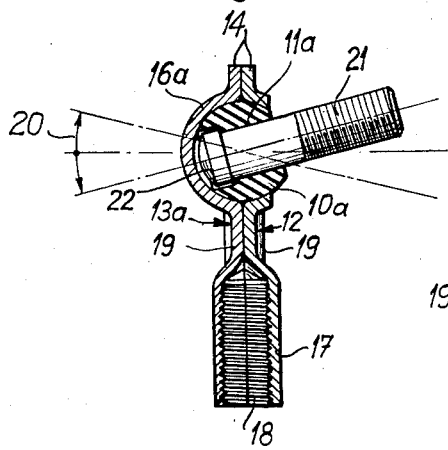
FIG. 3 is a sectional view of a second form of the joint head.
Figure 4:
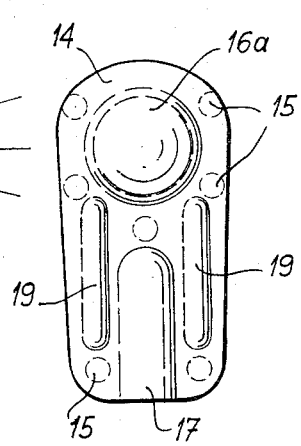
FIG. 4 is a view of the same joint head as seen from the left in FIG. 3.

The form according to FIGS. 3 and 4 differs from the one described essentially in that the two sheet-metal parts 12, 13a are not of entirely identical design, inasmuch as one part 13a has a closed semi-spherical portion 16a without aperture. Inserted in the bore 11a of the body 10a there is further a screw-bolt 21 which passes through the aperture in the part 12 and has a head 22 which is sunk within the body 10a and covered by the hollow-spherical portion 16a of the part 13a.

The last-described form permits of a different possibly simpler type of fastening the joint head to one of the elements to be swivelably connected to each other. But also in this case, it is possible to swivel the axis of the bore 11a and hence of the bolt 21 through the angle 20.

Figure 5:
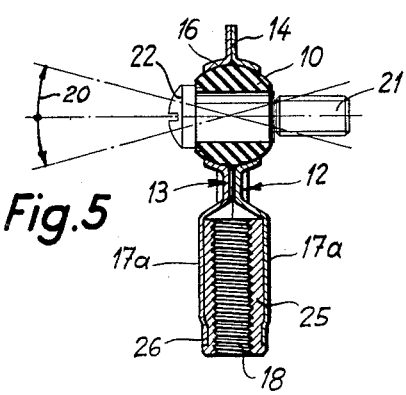
FIG. 5 shows a sectional view of a third form of embodiment.
Figure 6:
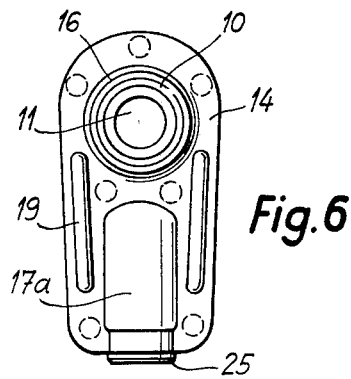
FIG. 6 is a side elevation of the same joint head without the connecting screw indicated in FIG. 5.

The joint head illustrated in FIGS. 5 and 6 differs only from that according to FIGS. 1 and 2 in that the thread 18 is not worked into the material of both parts 12 and 13, but into a sleeve 25 located between the outwardly pressed semi-cylindrical portions 17a. For giving a better hold to the threaded sleeve 25, it has outside a peripheral groove 26 in which engages a portion of the material of the two parts 12, 13. One end of the threaded sleeve 25 projects beyond the respective edges of the parts 12, 13 in order to permit a counternut, which is screwed onto the threaded bolt engaging the thread 18, to transmit its pressing action direct onto said sleeve 25. In order to prevent any turning of the sleeve 25, it may be given a non-circular cross-section. For the same purpose, the groove 26 may, if necessary, not extend over the whole periphery of the sleeve. The threaded sleeve 25 offers the advantage, that the two parts 12, 13 may be made of comparatively thin material, whose thickness does not permit the thread 18 to be cut-in direct.

Figure 7:
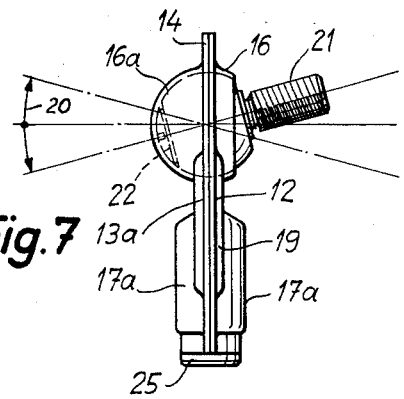
FIG. 7 represents an elevation of a fourth form.
Figure 8:
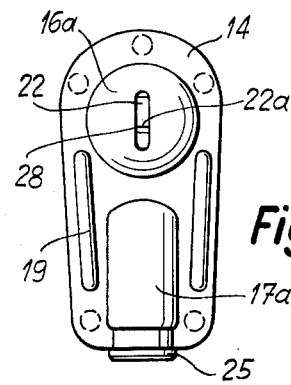
FIG. 8 is a view of the same joint head as seen from the left in FIG. 7.

The form shown in FIGS. 7 and 8 differs from that according to FIGS. 3 and 4 in one thing that there is also a threaded sleeve 25 and that the hollow-spherical portion 16a has a slit-shaped aperture 28 through which the bolt 21 may be held by means of a screwdriver and secured from turning, in order to permit of firmly tightening a nut screwed onto the threaded portion of the bolt 21. The head 22 of bolt 21 is provided with a slot 22a into which the screwdriver can be introduced. After mounting the joint head, the screwdriver is, of course, removed.

Figure 9:
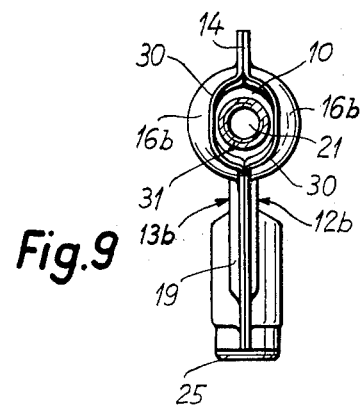
FIG. 9 illustrates partly in view and partly in cross-section another form.
Figure 10:
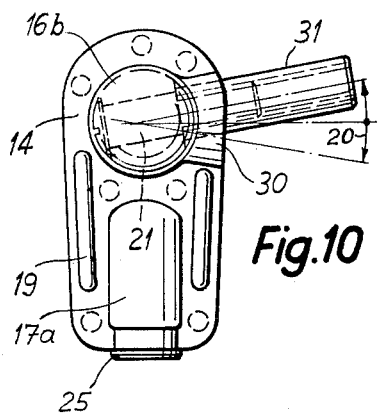
FIG. 10 shows a view of the same joint head as seen from the left in FIG. 9.

In the form according to FIGS. 9 and 10, the sheet-metal parts 12b, 13b each have a closed hollow-spherical outwardly pressed portion 16b. Again, both portions 16b hold therebetween an outside spherical body 10 which is passed through by a screw-bolt 21. In contrast to all other forms, the longitudinal axis of the bolt 21 runs in a plane which contains the parting line of the two parts 12b, 13b. To make this possible, a marginal portion 30 of each part 12b, 13b is pressed outwards. The bolt 21 has screwed thereon a threaded sleeve 31 which engages between the two marginal portions 30 and is carried by them in such a way that the axis of the bolt 21 and sleeve 31 can swivel substantially only in the aforesaid plane through an angle 20, as shown in chain-dotted lines in FIG. 10.

The last-described joint head may be adopted instead of a joint fork connection and has the advantage that the spherical body 10 is practically entirely encased and thus protected to a great extent from being damaged and dirtied.

The joint head shown in FIGS. 11 and 12 again has an outside spherical body 10 with a diametrical bore 11. The body 10 consists of an elastically compressible synthetic resin resistant to abrasion and swivelably supported in a cage made up of two stamped and pressed sheet-metal parts 12c, 13c. These two parts are of entirely identical design and include interengaging flanges 14c which are connected to each other by welding spots 15. On each of said parts 12c, 13c a hollow-spherical segmental portion 16 is pressed outwards, having in its middle an aperture which gives access to the bore 11 of the body 10. The hollow-spherical portions 16 together constitute the bearing of the body 10 which is clamped friction-tight by the portions 16 so as to allow the body 10 to turn within the cage, but without there being any play between the body 10 and the hollow-spherical portions 16. Lubrication of the spherical outer surface of the body 10 is unnecessary.

Each flange 14c is provided with a peripheral edge 35 bent out at right angles. The peripheral edges 35 of the two cage parts 12c, 13c constitute a cylindrical outer surface of the joint head and enable the latter to be inserted according to FIG. 11 into a bore 36 of a machine part 37, say, a lever.

The form according to FIGS. 13 and 14 differs from the one described, in that the flanges 14d of the cage parts 12d, 13d do not have any peripheral edges, but on the other hand some apertures 38 adapted for fixing screws 39 or the like to pass through. By means of the screws 39, the joint head may be attached to a machine part 40 possessing a recess 41 into which one hollow-spherical portion 16 and the respective half of the body 10 can project.

The form of the joint head shown in FIGS. 15 and 16 is similar to the one according to FIGS. 11 and 12, in that again each of the flanges 14e has a peripheral edge 35a bent out at right angles which, however, is not of a cylindrical, but substantially of prismatic shape. The joint head may therefore be applied with the two peripheral edges to a flat face of a machine part 42 and be connected thereto by welding or soldering.

All forms of embodiment disclosed hereinbefore could be modified in that the two parts 12, 13 or 12a, 13a or 12b, 13b of the cage are connected to each other by means of an adhesive and not by welding. In a given case, said parts of the cage may consist of synthetic resin.

In all forms described, the bolt inserted into the spherical body 10 or 10a can be slightly turned, in order to enable the machine part attached to said bolt to perform a rotary movement about the axis of the bore 11 or 11a. Advantageously, however, the spherical body 10 or 10a is clamped with relatively slight pressure within the cage formed by the parts 12, 13; 12, 13a; 12b, 13b; 12c, 13c, 12d, 13d or 12e, 13e, in order to prevent the body 10 or 10a from taking part in the aforementioned turning of the bolt in the bore 11 or 11a. In this way, the friction and the wear resulting therefrom due to the turning of the bolt will be confined to the surfaces between said bolt and the body 10 or 10a, whereas the occurring friction and the wear resulting therefrom when swivelling the axial direction of the bolt will be confined to the hollow-spherical portions 16, 16a or 16b.

The desired slight clamping of the body 10 or 10a may, for instance, be achieved by not entirely pressing-out the hollow-spherical portions 16, 16a or 16b. When assembling the joint head under pressure onto the flanges 14, the hollow-spherical portions 16, 16a or 16b being slightly elastically yielding will spring outwards, and the body 10 or 10a is elastically compressed, if it consists of synthetic resin. Due to the resulting elastic tension, the body 10 or 10a remains free of play within the cage for a very long period of service of the joint head. Thus any high precision in the manufacture of the joint head may be dispensed with, and any varying thermal dilatations of the body 10 or 10a and cage will lead neither to undue strong clamping of the body nor to any undesired play between body and cage.

If the spherical body 10 or 10a consists of synthetic resin, the manufacture of the described joint head encounters, however, certain difficulties. Since a considerable tolerance must be allowed to the dimensions of the synthetic resin body 10 or 10a, the hollow-spherical portions 16, 16a or 16b of the two cage parts cannot be molded from the outset so as to ensure the desired friction, though not too great, between spherical body and cage. In the manufacture of the joint heads with a synthetic resin body 10 or 10a, the following procedure has proved suitable:

At first, the two cage parts are pressed singly into the desired shape, the hollow-spherical portions 16, 16a or 16b of each cage part being formed slightly oversized. After the body 10 or 10a has been placed between the two hollow-spherical portions of the associated cage parts and the flanges thereof have been interconnected, the body 10 or 10a still will have a certain play. Finally, by pressing between two stamps with hollow-spherical faces, the portions 16, 16a or 16b of both cage parts are constricted so much as to compress the spherical body elastically by a slight extent. Upon relieving the stamp pressure, the cage springs somewhat back again on account of its elasticity. If the pressing onto said portions 16, 16a or 16b has been properly rated, finally there still remains a slight clamping action between spherical body and cage, so that the desired friction-tight connection is brought about. Should, after pressing, the body still show too much play, the pressing operation must be repeated. In this way it is possible to suit the cage accurately to the outside dimensions of the spherical body, even if these outside dimensions are somewhat varying in each spherical body.

In the last-described procedure it is of advantage to choose somewhat low the thickness of the sheet-metal used for making the cage parts. Thus the cage parts can be more easily shaped by pressing and there will be greater elastic resiliency of the cage, which together with the elastic resiliency of the spherical body 10 or 10a ensures a running fit of the spherical body, free from play, for a comparatively long period of service of the joint head.

If the spherical body 10 or 10a consists of non-elastic, or only insufficiently elastic, compressible material such as sintered metal, subsequent adaptation of the cage to the spherical body in the described manner is impossible.

What I claim is:

1. Joint head for movably connecting two machine elements, particularly levers and linkages, comprising an outside spherical body, and a supporting cage of two parts and having interengaging flanges connected firmly and undetachably to each other and having outwardly pressed hollow spherical portions, said spherical body being frictionally held in the hollow spherical portions and being composed of an elastically compressible synthetic material and in direct contact with the hollow spherical portions of the cage in a slight compressed condition, said spherical body being provided with a diametrical boring in which a bolt is rotatably journaled, said cage having at least one opening for the passage of said bolt, the two parts of the cage being provided with semi-cylindrical outwardly pressed portions having an internally threaded sleeve arranged therebetween, said sleeve projecting with one end over the respective edges of the parts of the cage and having at least one recess on the outside engaged by a portion of the adjacent part of the cage.

2. Joint head according to claim 1, wherein the hollow-spherical portion of one part of the cage is provided with a central opening constituting the passage for the bolt, the hollow-spherical portion of the other part of the cage having a smaller aperture to receive a tool for securing the bolt from turning when the joint is connected to a machine element by means of the bolt.

3. Joint head according to claim 1, wherein the hollow-spherical portions of the two parts of the cage are closed, the opening for the passage of the bolt being formed between outwardly pressed flange portions of the two parts of the cage.

References Cited in the file of this patent

UNITED STATES PATENTS

| | | |
|---|---|---|
| 2,305,880 | Leighton | Dec. 22, 1942 |
| 2,350,482 | Venditty | June 6, 1944 |
| 2,365,552 | Hill | Dec. 19, 1944 |
| 2,382,773 | Chambers et al. | Aug. 14, 1945 |
| 2,601,875 | Dardani | July 1, 1952 |
| 2,886,379 | Small | May 12, 1959 |
| 2,892,246 | Mansfield | June 30, 1959 |
| 2,952,901 | King | Sept. 20, 1960 |
| 2,996,308 | Cislo | Aug. 15, 1961 |

FOREIGN PATENTS

| | | |
|---|---|---|
| 818,720 | Germany | Oct. 29, 1951 |